United States Patent
Krupadanam et al.

(10) Patent No.: US 8,214,122 B2
(45) Date of Patent: Jul. 3, 2012

(54) ENERGY ECONOMY MODE USING PREVIEW INFORMATION

(75) Inventors: Ashish S. Krupadanam, Rochester Hills, MI (US); Edward J. Grant, East Lansing, MI (US); Donn W. Glander, Grosse Pointe Woods, MI (US); Pei-Chung Wang, Troy, MI (US); Man-Feng Chang, Troy, MI (US); Sanjeev M. Naik, Troy, MI (US); Balarama V. Murty, West Bloomfield, MI (US); William C. Lin, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1119 days.

(21) Appl. No.: 12/100,460

(22) Filed: Apr. 10, 2008

(65) Prior Publication Data

US 2009/0259354 A1    Oct. 15, 2009

(51) Int. Cl.
*B60T 7/12* (2006.01)
*B60T 8/32* (2006.01)
*B60K 17/00* (2006.01)
*B60K 17/06* (2006.01)

(52) U.S. Cl. ............. 701/79; 701/93; 180/170; 180/364
(58) Field of Classification Search ............. 701/22, 701/93, 95, 96, 110, 121, 123, 35, 84, 79; 180/65.21, 65.1–65.8, 170, 364; 340/995.1, 340/995.19; 903/930
See application file for complete search history.

(56) References Cited

U.S. PATENT DOCUMENTS

| | | | |
|---|---|---|---|
| 4,853,720 A | 8/1989 | Onari et al. | |
| 5,931,886 A * | 8/1999 | Moroto et al. | 701/54 |
| 5,944,766 A | 8/1999 | White | |
| 6,076,036 A | 6/2000 | Price et al. | |
| 6,134,499 A | 10/2000 | Goode et al. | |
| 6,202,021 B1 | 3/2001 | Kresse et al. | |
| 6,282,482 B1 | 8/2001 | Hedström | |
| RE37,434 E | 11/2001 | Onari et al. | |
| 6,314,347 B1 * | 11/2001 | Kuroda et al. | 701/22 |
| 6,470,256 B1 | 10/2002 | Cikalo et al. | |
| 6,836,719 B2 | 12/2004 | Andersson et al. | |
| 2003/0034192 A1 | 2/2003 | Takano | |
| 2004/0084237 A1 * | 5/2004 | Petrie, Jr. | 180/170 |
| 2006/0224295 A1 | 10/2006 | Tengler et al. | |
| 2007/0005218 A1 | 1/2007 | Ueyama | |
| 2008/0059035 A1 * | 3/2008 | Siddiqui et al. | 701/93 |

FOREIGN PATENT DOCUMENTS

| | | |
|---|---|---|
| JP | 2003-343305 | 12/2003 |
| JP | 2006-226178 | 8/2006 |
| WO | WO 95/31638 | 11/1995 |

* cited by examiner

*Primary Examiner* — James P Trammell
*Assistant Examiner* — Muhammad Shafi

(57) ABSTRACT

A method for improving energy efficient operation of a vehicle includes monitoring vehicle operating characteristics, modeling operation of the vehicle by utilizing the vehicle operating characteristics to estimate energy consumption rates of the vehicle across an allowable vehicle operating range, and generating a control output to the vehicle on the basis of the energy consumption rates.

15 Claims, 8 Drawing Sheets

ENERGY ECONOMY MODE USING PREVIEW INFORMATION

TECHNICAL FIELD

This disclosure is related to energy efficient control of a vehicle.

BACKGROUND

The energy efficiency of a vehicle depends upon a number of variables, including vehicle speed, gear state, road conditions, and vehicle load. The fuel efficiency of an internal combustion engine is dependant on the engine speed and load operating point. A vehicle traveling uphill at a given speed will consume more energy than the same vehicle traveling downhill at the same speed. A vehicle heavily loaded by an object under tow at a given speed will consume more energy than a normally loaded vehicle otherwise under the same conditions at the same speed.

Energy used to power vehicles may take the form of hydrocarbon fuels, such as gasoline, diesel or ethanol; battery charge; hydrogen fuel cells; or other forms of electrical or chemical energy. If more than one type of energy is available in a vehicle, the selections of energy to be used in various portions of travel can impact fuel efficiency. Also, energy recovery is available in many vehicular applications.

Many methods are known to evaluate current vehicle conditions. Diagnostic algorithms are known to estimate vehicle load based upon operating variables. Sensors may estimate factors internal to the vehicle including fuel grade, operator information, and maintenance history including oil change history. Sensors may evaluate traffic conditions, grade, weather conditions, and other current road conditions. Additionally, remote systems may be accessed over communications networks to evaluate conditions along a road or over a planned route, including road grade, traffic, speed limitations, existence of urban areas and traffic signals, and to forecast weather. Further processing is known to manage hybrid energy usage, evaluate operator tendencies, and track vehicle specific efficiencies.

SUMMARY

A method for improving energy efficient operation of a vehicle includes monitoring vehicle operating characteristics, modeling operation of the vehicle by utilizing the vehicle operating characteristics to estimate energy consumption rates of the vehicle across an allowable vehicle operating range, and generating a control output to the vehicle on the basis of the energy consumption rates.

BRIEF DESCRIPTION OF THE DRAWINGS

One or more embodiments will now be described, by way of example, with reference to the accompanying drawings, in which.

DETAILED DESCRIPTION

Figure 1:
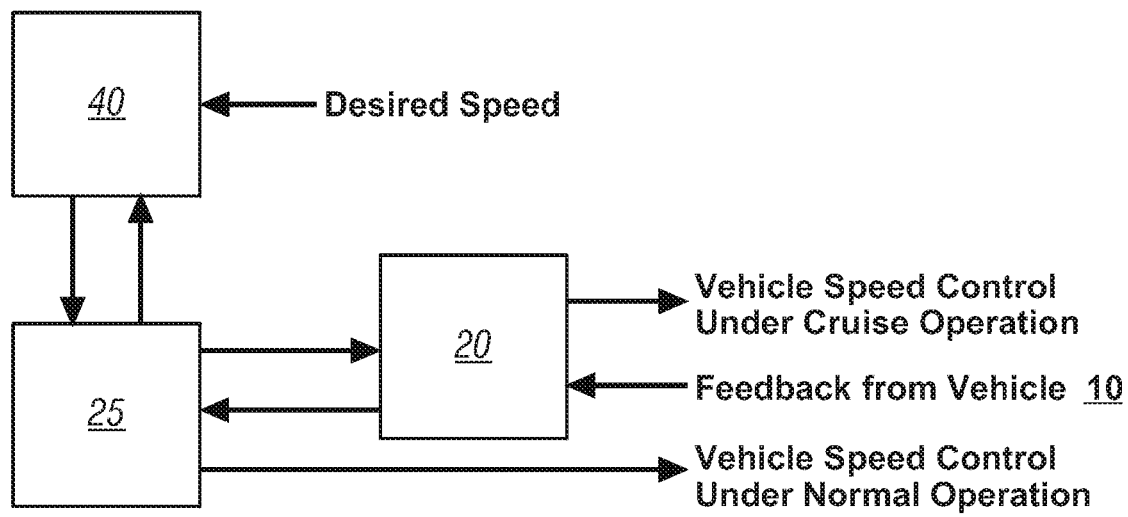
FIG. 1 is a block diagram of a known vehicle and related speed control devices in accordance with the disclosure.

Referring now to the drawings, wherein the showings are for the purpose of illustrating certain exemplary embodiments only and not for the purpose of limiting the same, FIG. 1 illustrates a vehicle utilizing known control methods to receive operator input to select and maintain vehicle speeds in accordance with the disclosure. Driver interface device 40 receives inputs from an operator including pedal positions, gear commands, and cruise control inputs. Control module 25 receives inputs from driver interface device 40 and is in direct communication with cruise control module 20. Commands regarding speed control and gear state are either directly conveyed from control module 25 to vehicle 10 or are generated from cruise control module 20 on the basis of inputs from control module 25. Vehicles with multiple energy sources, such as hybrid electric vehicles, will also include a motor/generator unit (MGU) to manage energy usage and regeneration (not shown).

Figure 2:
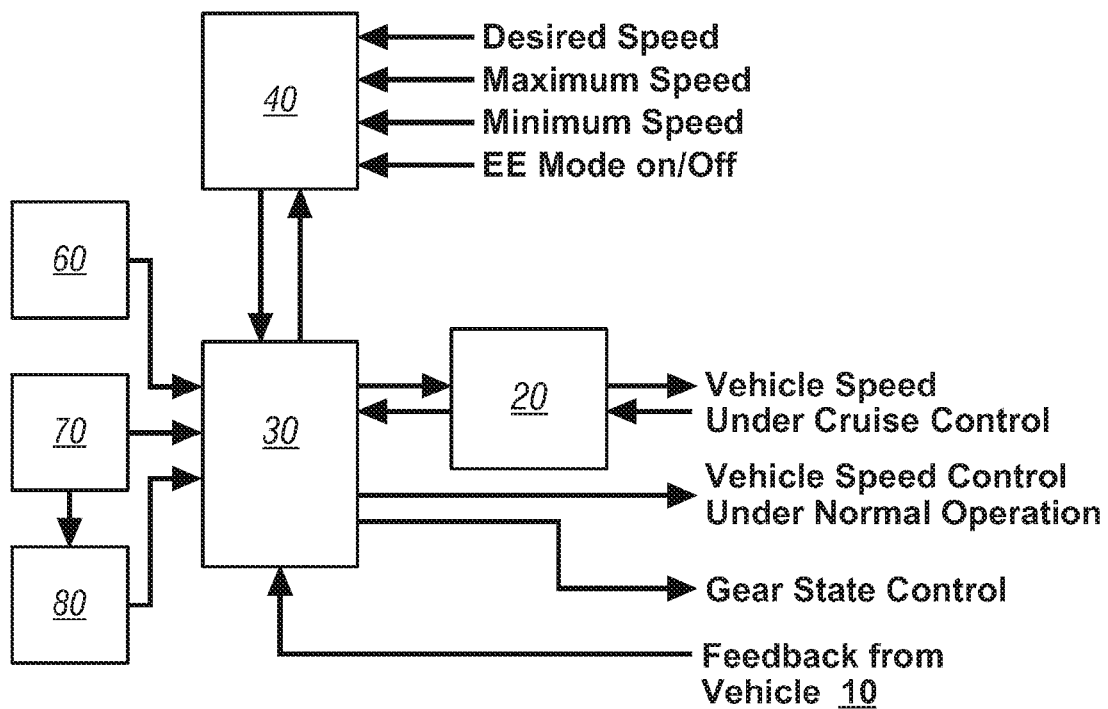
FIG. 2 is a block diagram illustrating an exemplary vehicle utilizing an energy economy module in accordance with the present disclosure.

FIG. 2 illustrates an exemplary embodiment of vehicle 10 including an energy economy module (EE module) 30 in accordance with the disclosure. EE module 30 receives inputs from various sources and is in direct communication with cruise control module 20. Commands regarding speed control and/or gear state are either directly conveyed from EE module 30 to vehicle 10 or are generated from cruise control module 20 on the basis of inputs from EE module 30. As vehicle 10 is set into energy economy mode (EE mode) and a parameter or parameters are set, EE module 30 can directly control vehicle operating parameters such as speed and transmission gear state, effecting energy efficient modulations to the user input, or EE module 30 can interact with cruise control module 20 to effectuate vehicle control under cruise control with energy efficiency modulations. In one embodiment, cruise control module controls the speed of vehicle 10, and EE module simultaneously controls the gear state of vehicle 10. EE module 30 incorporates an algorithm which processes the various inputs to determine whether changes in vehicle speed within an allowable speed range, changes in gear state or gear shifting strategy, or changes in energy usage will make vehicle 10 more energy efficient. Feedback information regarding the operation of the vehicle is readily available in the form of vehicle speed, gear state, MGU state or other relevant operation data. It should be noted that energy efficiency may include reduced fuel consumption in a vehicle with only a combustion engine, or energy efficiency may encompass overall energy efficiency in a vehicle with multiple power sources, such as a hybrid electric vehicle. Inputs in this particular exemplary embodiment come from a driver interface device 40, a GPS device 60, on-board sensors 70, a remote processing unit 80, and feedback from the operation of vehicle 10. Processing within EE module 30 models the operation of vehicle 10 and estimates energy consumption rates across the allowable speed range. These energy consumption rates may be used to control the vehicle based primarily on energy efficiency, or the rates may be utilized in comparison to a set desired speed to select vehicle control conditions to balance the driver's intentions and the need for energy efficiency. Control output from EE module 30 based on energy efficiency can be completely automatic, affecting control speeds without alerting the operator. Alternatively, control output can be partially or fully manual, either suggesting speeds to the operator or providing speed options to the operator with corresponding efficiency information on a visual display for selection. As with all of the exemplary embodiments described herein, vehicles are complex devices, and configurations of particular vehicles may vary. For example, a vehicle might instead have a cruise control module 20 accepting inputs from a driver interface device 40 and then setting cruise control speed as recommended settings to EE module 30. The particular arrangement of components within the system is not paramount, and the exemplary embodiments described herein are meant only as examples of how EE module 30 might be utilized to process information and effect control of vehicle speed, gear state, and other settings.

Figure 3:
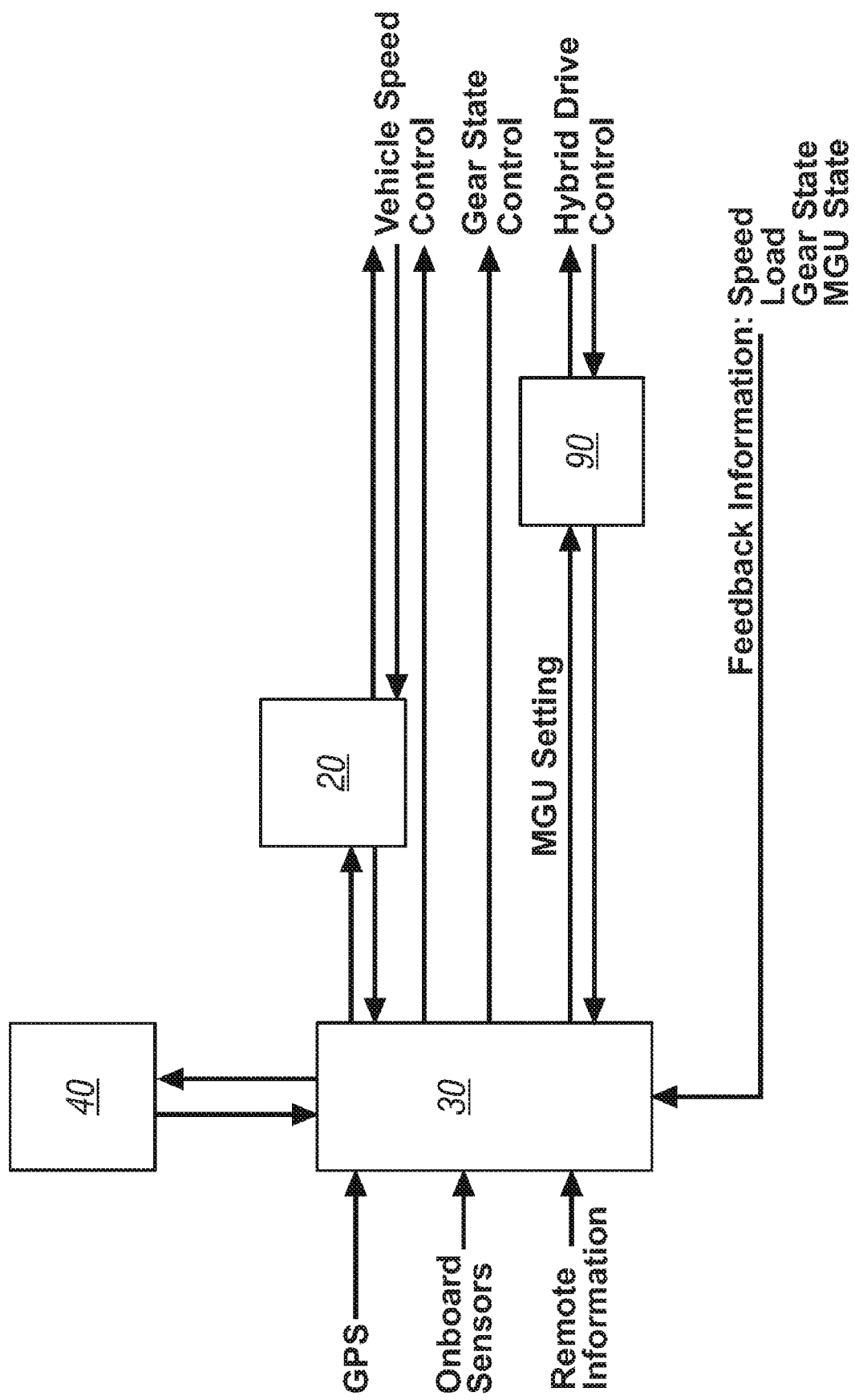
FIG. 3 is a block diagram illustrating an exemplary use of an energy economy module in coordination with a hybrid control device in accordance with the disclosure.

As noted above, EE module 30 may be used in coordination with a hybrid control device, further improving energy efficiency by modulating energy usage from a plurality of energy sources and managing energy recovery capabilities. One exemplary configuration of hybrid drive vehicle utilizes an internal combustion engine deriving power from an energy source comprised of a storage tank of hydrocarbons, such as gasoline, and utilizes an electric drive system deriving power from a battery storing electrical energy in an electro-chemical state. FIG. 3 illustrates an exemplary use of EE module 30 in coordination with a hybrid control device or MGU 90 in accordance with the disclosure. As with the embodiment illustrated in FIG. 2, EE module 30 incorporates an algorithm which processes the various inputs to determine whether changes in vehicle speed within an allowable speed range, changes in gear state or gear shifting strategy, or changes in energy usage will make vehicle 10 more energy efficient. In this particular embodiment, feedback from vehicle 10 includes information regarding speed, vehicle load, gear state, and MGU state, and EE module 30 effects control instructions for vehicle 10 either directly to MGU 90 or interacts with cruise control module 20 to effectuate vehicle speed control under cruise control with energy efficiency modulations. MGU 90 can contain algorithms to process signals from EE module 30 and cruise control module 20 to effectuate energy efficiency strategies through speed control, gear state control, and energy usage control, or MGU may simply enact instructions processed by EE module 30 and cruise control module 20.

Figure 4:
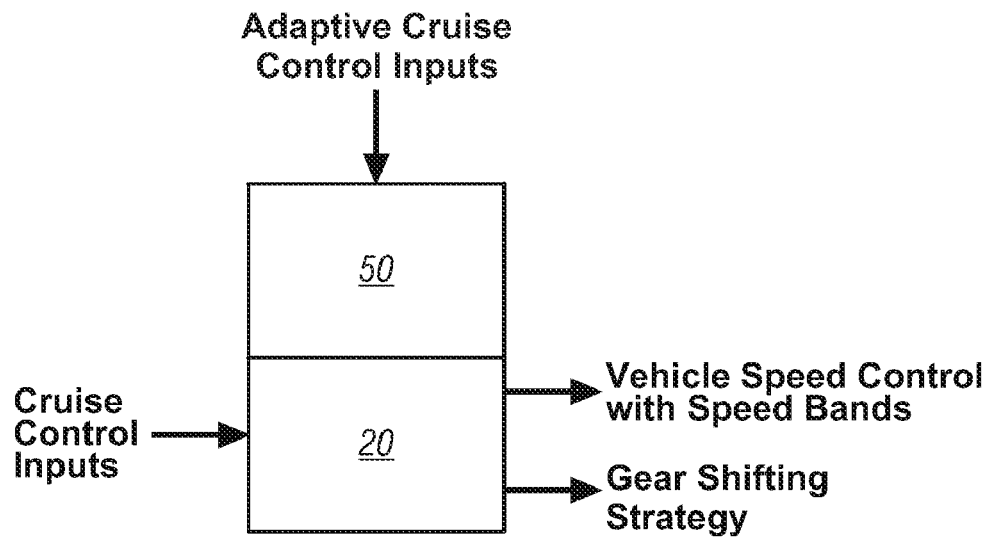
FIG. 4 is a block diagram of a vehicle utilizing adaptive cruise control in accordance with the present disclosure.

Cruise control module 20 may enable simply setting a speed and maintaining the vehicle at the set speed; however, a method known as adaptive cruise control is known whereby an adaptive cruise control module takes multiple factors into account, such as traffic patterns detected by radar and road grade conditions, and automatically controls the vehicle speed to compensate. A primary benefit of these adaptive cruise control systems is that it reduces the need for the driver to intervene with the cruise control settings once they are activated. For example, if the vehicle being controlled is traveling at 55 miles per hour and encounters another vehicle going 45 miles per hour, the adaptive cruise control module will sense the presence of the other vehicle and reduce speed to compensate. FIG. 4 illustrates the operation of an exemplary known adaptive cruise control module 50 in accordance with the disclosure. Adaptive cruise control module 50 accepts inputs relative to the adaptive cruise control logic and works in conjunction with cruise control module 20 to define speed bands and a transmission strategy operative to effectuate speed control based upon the adaptive cruise control logic. Adaptive cruise control module can be used to augment cruise control module 20 in any of the illustrated embodiments described herein, and EE module 30 works within the framework of adaptive cruise control by methods described in more detail herein.

The cruise control module 20, EE module 30, and adaptive cruise control module 50 are preferably embodied in a general-purpose digital computers comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each control module has a control algorithm, comprising resident program instructions and calibrations stored in one of the storage mediums and executed to provide the functions of the computer. The control algorithm is executed during preset loop cycles. The algorithm stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, the algorithm may be executed in response to the occurrence of an event.

The aforementioned control modules communicate with other control modules, sensors, and actuators via a local area network (hereafter 'LAN') bus. The LAN bus allows for structured communication of states of operating parameters and actuator command signals between the various control modules. The specific communication protocol utilized is application-specific. The LAN bus and appropriate protocols provide for robust messaging and multi-control module interfacing between each module and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

EE module 30 can receive inputs from a number of sources. Vehicle speed, gear state, and MGU state, when applicable, are important feedback prompts for EE module to effect its controls. Of particular additional use to EE module 30 in estimating energy consumption rates are inputs which describe road grade and vehicle load. Road grade or the inclination of the road over which the vehicle is traveling plays a large role in energy efficiency. Likewise, the particular speed and gear settings of vehicle 10 when traveling over a certain road grade can have a large impact on energy efficiency. EE module 30 evaluates the current road grade or the road grade anticipated at some point in the future, estimates energy consumptions across the allowable speed range at that road grade, and commands adjustments to cruise control module 20 on the basis of energy efficiency. Road grade may be directly measured by an inclinometer, or road grade may be indicated in coordination with a map location. GPS device 60 allows for very accurate determination of the location and direction of travel of vehicle 10, and this information can be used to supply road grade information from GPS device 60 to EE module 30. Likewise, vehicle load or the net effect of variables such as cargo weight, objects under tow, and wind forces on vehicle 10 plays a large role in energy efficiency. Vehicle load is a primary factor in determining the relationship of torque applied by the powertrain to the wheels of vehicle 10 to the speed at which vehicle 10 travels. Vehicle load cannot be determined directly; instead, vehicle load must be calculated from available information. One known method to determine vehicle load is to compare an actual energy consumption rate to a calibrated energy consumption rate. EE module 30 receives an input from vehicle 10 in the form of an actual energy consumption rate. The difference between the actual energy consumption rate and a calibrated energy consumption rate allows an estimation of the net additional energy required to propel vehicle 10 at a given speed, and this net additional energy can be converted into the vehicle load.

Other inputs may also be gathered to improve the accuracy of estimating energy consumption rates across the allowable speed range. Tire pressure, traffic conditions, road conditions, weather, vehicle maintenance history, and driver operating patterns may all be factored into the estimated energy consumption rates, allowing more accurate judgments to be made regarding available energy efficiencies. Tire pressure may be estimated by on-board sensors 70 in direct connection with the wheels, or tire pressure may be calculated on-board by EE module 30 or over a communication network by remote processing unit 80 by analyzing wheel rotation data, for example, data generated by anti-lock braking mechanisms. Traffic conditions may be estimated by on-board sensors 70 in the form of on-board proximity or radar devices, through the analysis of information available from remote processing unit 80 over a communications network, or by analysis of driver inputs such as braking and acceleration. Information related to road conditions could include construction information available from GPS device 60 or other source, road roughness estimates based on onboard sensors located in such areas as suspension subsystems or anti-lock bracking subsystems, or tire traction data. Information related to weather could be gathered from a number of sources including on-board sensors 70 including temperature measurements, wheel slip data, anti-lock braking data, outside air velocity readings, and light sensors; map data from GPS device 60 coupled with remote processing unit 80; or any other readily available source of weather detection. Maintenance information such as mileage since last oil change or measures of combustion efficiency such as recordation of misfires is useful to project fuel mileage under certain operating conditions. Additionally, historical analysis may be performed upon driver operating patterns based on the overall operation of the vehicle or on a driver specific basis, the driver identity indicated by such indicators as key used in the ignition, driver's seat settings, weight sensor in the driver's seat, or other means well known in the art. Driver operating patterns can include various areas of vehicle operation, including but not limited to data regarding a driver's preferred acceleration patterns, speeds traveled on particular roads or under particular driving conditions, and habitual driving routes. Data from these additional sources may be used by EE module 30 to adjust estimated energy consumption rates, adjust parameters for selecting and adjusting speeds within the allowable speed range, or to indicate warnings or recommendations to the driver on the basis of energy efficiency.

Figure 5:
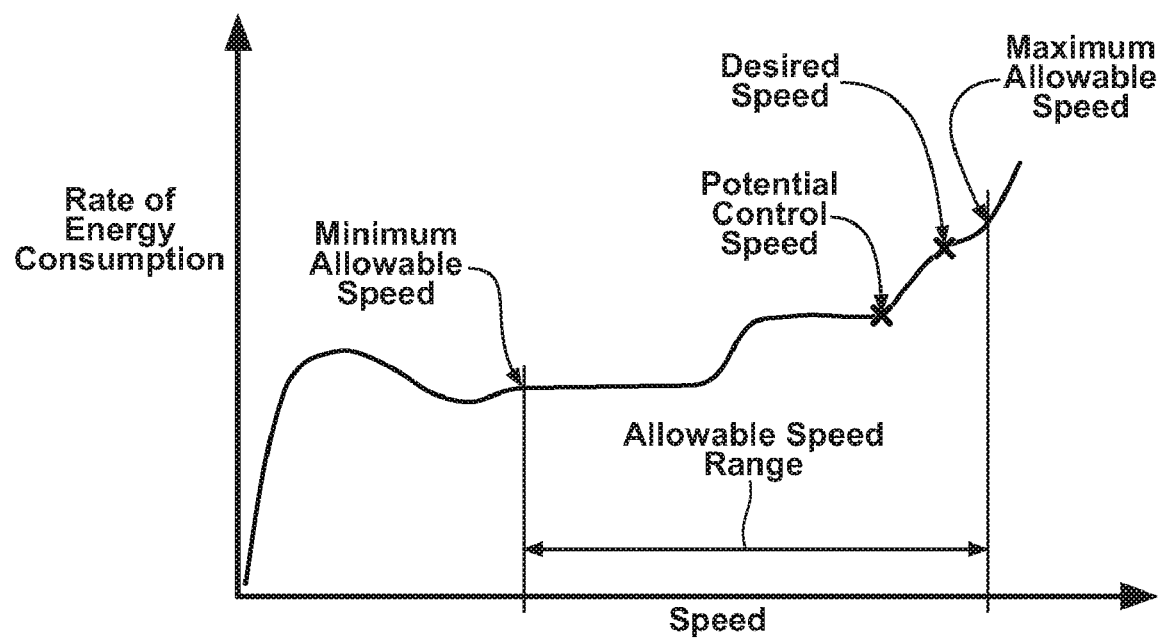
FIG. 5 is a graphical representation of rate of energy consumption versus vehicle speed in accordance with the present disclosure.

EE module 30, as previously mentioned, can realize gains in energy efficiency by modulating at least vehicle speed control. FIG. 5 illustrates an exemplary graph depicting energy consumption rates over a range of vehicle speeds and potential energy efficiency gains possible by modulating vehicle speed in accordance with the present disclosure. A minimum allowable speed and a maximum allowable speed are defined to create an allowable speed range, and a desired speed is set. The particular settings for the allowable speed range and the desired speed may be selected in some combination through driver interface device 40, speed limit values derived from GPS device 60 or through other remote electronic means, on-board sensors 70, tabulated or calculated values, and analysis of driver tendencies. An algorithm identifies a potential control speed offering potential energy savings by balancing energy economy and deviation from the desired speed. If some measure of energy efficiency may be gained by changing the vehicle speed within the allowable speed range by some acceptable amount, then EE module 30 issues a command to change speed. In normal or non-cruise operation, the EE module 30 will affect speed control directly. Because speed control under non-cruise operation is in response to an operator command such as a foot pedal position, some indication to the operator can be utilized to inform the operator that the speed change is intentional. For example, an operator, perceiving the vehicle slowing to improve energy efficiency but not understanding the operation of EE module 30, might increase depression of the accelerator pedal to compensate. This indication may come in many forms including an indication light, an audible tone or message, a message to a vehicle information device, pedal feedback, etc. In cruise operation, the EE module 30 will send a control signal to cruise control module 20 to affect the control speed to the potential control speed. Because the operator is not required to directly control vehicle speed under cruise operation, an indication need not be used to explain the speed change to the operator, but an indication may still be used to explain the change to especially attentive operators and avoid a perception that an unexpected change has occurred.

In addition to energy efficiency improvements gained by modulation of vehicle speed, energy efficiency can also be improved by managing gear state selection. As is well known in the art, gear state selection is a tradeoff between increased torque and increased energy efficiency. Known control systems judge the current operating conditions of a vehicle and issue gear state commands to preserve certain driveability standards. EE module 30 provides an ability to utilize more information to control gear selection. For example, a vehicle going up an incline under set operator commands and gear conditions may begin to slow. Under known gear state control methods, the gear state would likely be shifted into a lower gear in order to compensate for the incline with more torque. Alternatively, known hybrid vehicles might utilize a secondary power source to boost torque to compensate for the incline. EE module 30 can check the terrain of the road ahead and forestall a gear state change or other action if the vehicle is close to the top of the incline. Another exemplary benefit can be utilized by previewing likely vehicle speeds based on upcoming road data and adjusting gear strategy to save energy. For example, a vehicle operating under known control methods operates on the basis of current conditions and sensor inputs. EE module 30 can preview the legal speed limits or traffic patterns ahead and utilize higher gear selections to reduce speed efficiently in anticipation of pending slower vehicle speeds.

Additionally, energy efficiency can also be improved in vehicles utilizing multiple energy sources by managing energy selection and regeneration, for example, by controlling MGU strategy. Different propulsion methods operate with higher efficiency in different operating ranges. It is known in the art that electric drive motors tend to operate more efficiently at low vehicle speeds and gasoline internal combustion engines tend to operate more efficiently at higher, sustained speeds. If a vehicle is traveling at a speed in a middle range, EE module 30 can preview later projected driving conditions to determine which energy source will be best used later. For example, if later conditions appear to include low speed driving with frequent stops, then utilizing the internal combustion engine presently to save battery charge for the low speed driving may be most efficient. Alternatively, if later conditions appear to include mostly highway travel at higher, sustained speeds, then utilizing the battery charge presently to save fuel may be most efficient. Also, future driving conditions may be estimated for potential to recharge the batteries through energy recovery. For example, if it is known that the vehicle is configured to efficiently recover energy through stop-and-go traffic, and EE module 30 projects that such traffic will increase in later portions of travel, the module may command more present battery usage to take full advantage of the recovery opportunity later.

The aforementioned efficiency strategies, controlling vehicle speed, gear state, and energy usage need not be utilized in isolation but rather are envisioned as a unitary vehicle control scheme. For instance, a vehicle operating under battery power, upon reading an approaching hill through a GPS map, can switch to gasoline power, lower gear state and accelerate into the hill, cut power to the engine and return to a higher gear towards the top of the hill, switch back to electric power at the top of the hill, and modulate operation to recover energy most efficiently on the down slope of the hill. In this way, the control methods can be used in combination to achieve the highest possible energy efficiency based upon information available to EE module 30.

Depending upon the application within vehicle 10, driver interface device 40 may allow the driver to activate the EE mode and to set some or all of the operating parameters to be used in the EE mode. For example, in an average consumer application, control over EE mode may be given to the driver, where the driver has the choice of operating in EE mode or in regular cruise control mode. This consumer driver may choose to set all available parameters or may only pick parameters of importance to the driver, allowing algorithms in EE module 30 to fill in others. In a commercial application, a company may set a fleet vehicle such that cruise control only operates in EE mode. Additionally, the control of the driver over the minimum allowable speed, the maximum allowable speed, and the desired speed may be granted or preset depending upon the purpose of the vehicle owner. A convenience mode is contemplated, wherein the operator merely inputs a minimum or a maximum speed, and the EE module 30 utilizes information available to fill in additional information such as maximum and minimum legal speeds, typical driving habits of the operator, or information available through a GPS system such as traffic or construction information. Additionally, a speed limit mode is contemplated, whereby a driver may activate EE mode, and vehicle 10 will travel at or within some consistent range of the legal speed limit based upon energy efficiency within the range without having to be reprogrammed.

Figure 6:
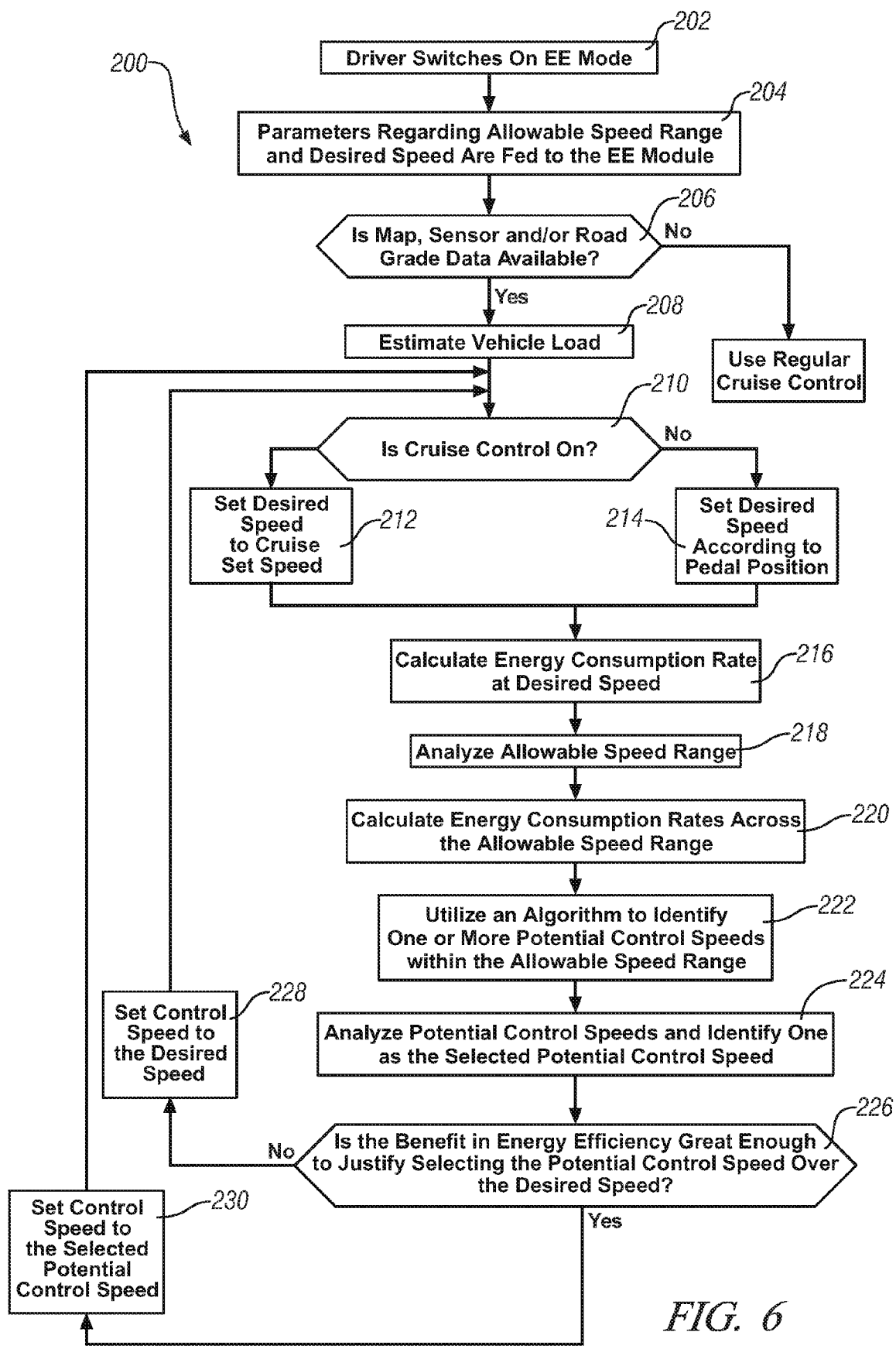
FIG. 6 is a flowchart depicting an exemplary process to control vehicle speed in accordance with the present disclosure.

FIG. 6 illustrates an exemplary process 200 wherein an EE mode is operated to control vehicle speed in accordance with the disclosure. At step 202, the operator initiates the process by switching on the EE mode. At step 204, parameters regarding the operation of EE mode including minimum allowable speed, maximum allowable speed, and desired speed are fed into EE module 30. As mentioned previously, all of these parameters may be input from the operator through the driver input device 40 or some of the parameters may be determined by EE module 30. At step 206, EE module 30 checks whether sufficient information is available in the form of map, sensor, and road grade data in order to operate the EE mode. If not enough information is available, then vehicle 10 operates under normal cruise control. If enough information is available to enter EE mode, EE module 30 determines the vehicle load at step 208. At step 210, the cruise control operation of the vehicle is determined. If the cruise control is on, then a desired speed is set at step 212 to a cruise control set speed. If the cruise control is off, then the desired speed is set at step 214 according to operator controls, such as accelerator pedal position. Next, EE module 30 at step 216 calculates the energy consumption rate at the desired speed. At step 218, EE module maps out the allowable speed range, compiling information regarding the operation of vehicle 10 typical across the allowable speed range, and at step 220, EE module calculates energy consumption rates across the allowable speed range. EE module 30 then analyzes these energy consumption rates at step 222 and utilizes an algorithm to identify one or more potential control speeds within the allowable speed range and the corresponding energy efficiency at each potential control speed. At step 224, the identified potential control speeds are analyzed, and one is selected as having the greatest potential in comparison to the desired speed. At step 226, an analysis is performed, judging whether the energy efficiency gained by adjusting vehicle speed to the potential control speed selected in step 224 justifies deviating from the desired speed. Various algorithms may be used in this analysis and may include some direct ratio of required energy efficiency benefit to speed change, a required energy efficiency benefit exponentially increasing as the potential control speed deviates increasingly from the desired speed, or a maximum allowable deviation based on a number of variables. Depending upon the outcome of the analysis of step 226, EE module 30 sets the control speed as either the desired speed at step 228 or the selected potential control speed at step 230. This control speed is then commanded for use in setting speed of vehicle 10. Process 200 then reiterates to reanalyze the allowable speed range and the related energy consumption rates to adjust for changing conditions.

Figure 7:
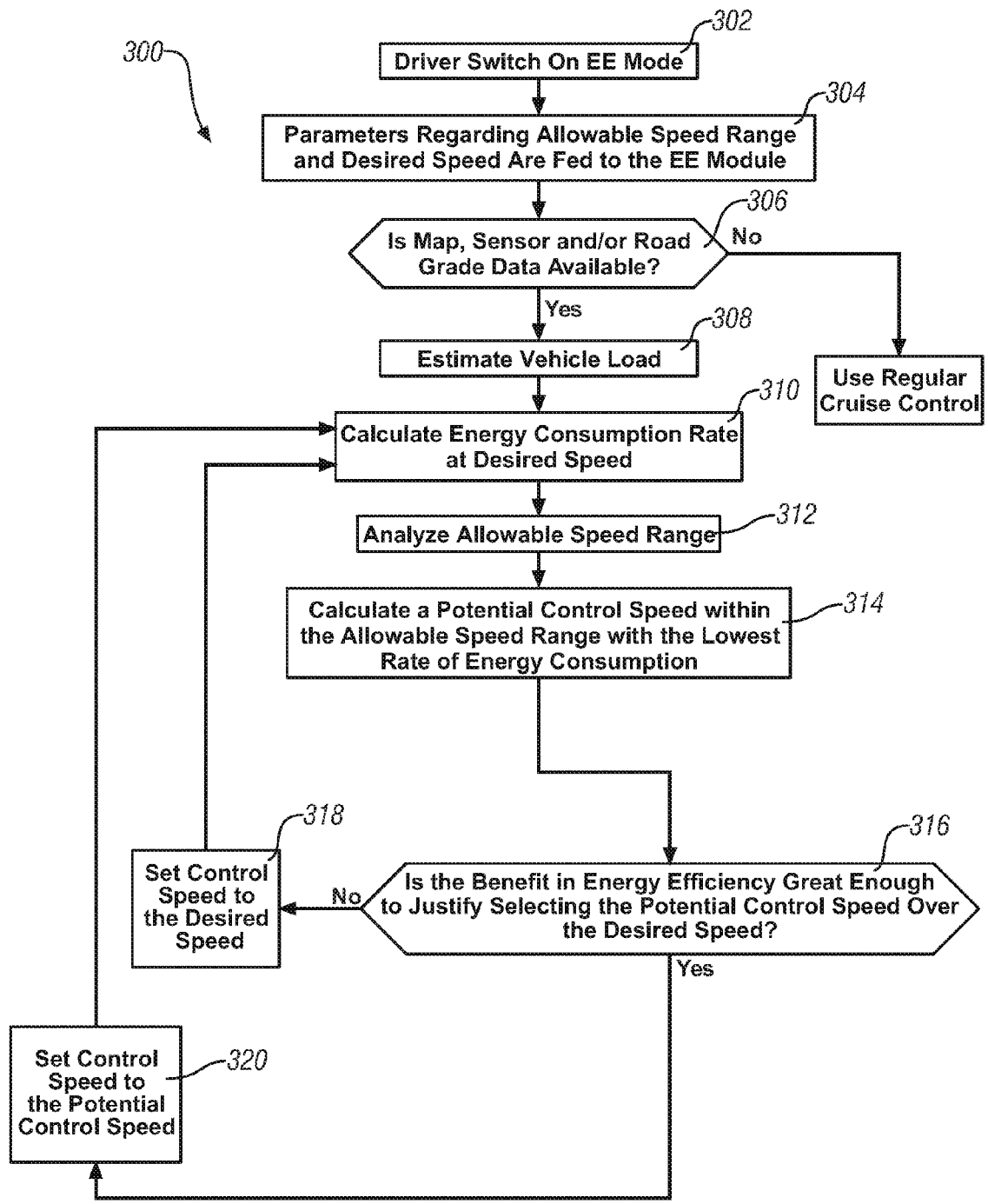
FIG. 7 is a flowchart depicting an alternative exemplary process to control vehicle speed in accordance with the present disclosure.

As mentioned above in relation to step 222, an algorithm is applied to select at least one potential control speed to compare with the desired speed. FIG. 7 illustrates another exemplary embodiment in process 300 wherein an EE mode is operated in accordance with the disclosure. Process 300 operates similarly to process 200, except that process 300 selects only a potential control speed with the greatest efficiency potential for comparison to the desired speed. In step 302, the operator switches on the EE mode, and in step 304, the operator inputs all of the EE mode parameters. In steps 306 through 312, the EE module 30 performs tasks similarly to corresponding steps in process 200. The desired speed of step 310 may be selected either by driver pedal position or by cruise control set points. At the point where the process acts to identify a potential control speed, this exemplary embodiment at step 314 selects the potential control speed by looking for the lowest energy consumption rate related to any speed within the allowable speed range and selecting the speed corresponding to that lowest rate. If multiple speeds operate at the same or virtually the same lowest energy consumption rate within the allowable speed range, then the highest speed associated with that lowest energy consumption rate is selected as the potential control speed. Steps 316 through 320 complete the process as before, comparing the potential control speed to the desired control speed and selecting a control speed to send to the cruise control module 20.

The EE mode may be used in conjunction with adaptive cruise control to provide the automatic adjustments enabled by the adaptive cruise control as well as energy efficient operation enabled by the EE mode. As described above, adaptive cruise control module 50 may be used in conjunction with any cruise control module 20 described herein. Also as described above, adaptive cruise control module 50 accepts inputs relative to the adaptive cruise control logic and works in conjunction with cruise control module 20 to define speed bands and transmission strategy. EE module 30 accepts various inputs in order to calculate energy efficiency across an allowable speed range. Cruise control module 20 accepts the inputs from both EE module 30 and adaptive cruise control module 50, and these inputs are combined to create speed bands and a transmission strategy adjusted to both inputs. One exemplary embodiment operates normally through the adaptive cruise control settings, but the EE module 30 performs analysis of the speed bands such that if adjusting the speed within the speed bands would enhance energy efficiency, a balancing algorithm is used to determine whether the change is speed is justified by the increased energy efficiency. It should be noted that driving safety standards will always override energy economy concerns. For example, a vehicle following a truck may be able to increase energy efficiency by increasing speed, but the safety concerns regarding the proximity to the truck would override the need for energy efficiency. Additionally, driver inputs, such as application of a brake pedal or quick turns of the steering wheel, will override any control inputs from the EE module. Another embodiment would allow brief excursions outside of the speed bands set by the adaptive cruise control to take advantage of energy efficient operation. For example, if a vehicle is approaching the top of a hill, the adaptive cruise control may require a gear shift to remain within the speed bands. However, the EE module 30 may determine that the crest of the hill is close enough that a shift and the associated expenditure of energy is not justified, thereby allowing the vehicle to briefly drop below the speed bands set by the adaptive cruise control module 50. In this way, EE mode may be utilized in conjunction with adaptive cruise control to gain the benefits of both concepts.

Figure 8:
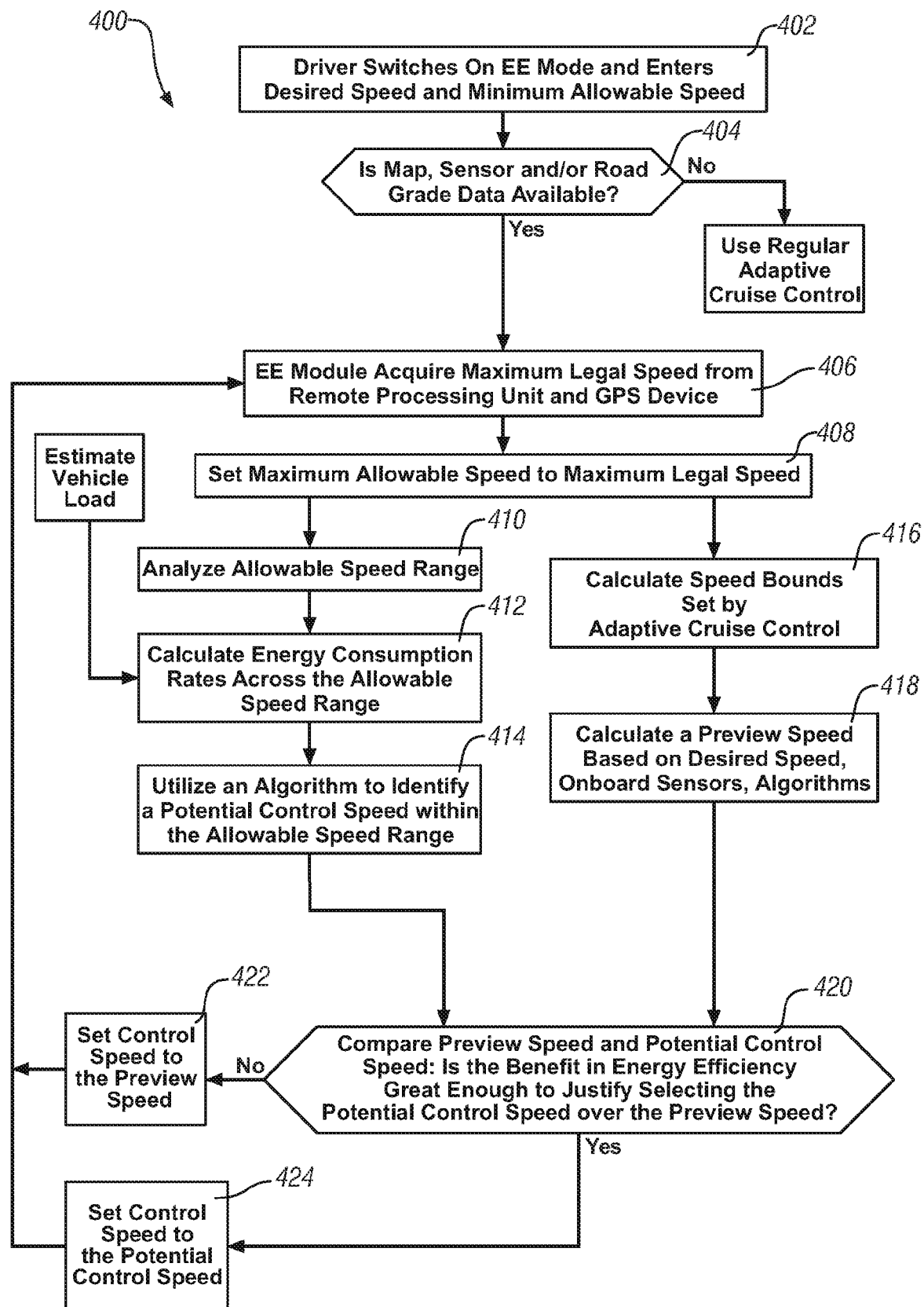
FIG. 8 is a flowchart depicting an alternative exemplary process in combination with adaptive cruise control in accordance with the present disclosure.

FIG. 8 illustrates a flowchart of an exemplary process 400 wherein an EE mode is operated in conjunction with an adaptive cruise control in accordance with the disclosure. In step 402, the driver switches on the EE mode, a desired speed, and a minimum allowable speed. The EE module inquires in step 404 whether adequate data is available to run in EE mode, and with a positive response, EE module inputs the speed limit for the present road and sets this value as the maximum allowable speed at steps 406, 408. Two paths are then initiated to determine a speed control input relative to EE mode and a speed control input relative to adaptive cruise control. Steps 410 through 414 analyze the allowable speed range, input the speed range analysis and the estimated vehicle load, calculate energy consumption rates across the allowable speed range, and identify a potential control speed for energy efficient operation. Steps 416 and 418 utilize adaptive cruise control logic to calculate speed bounds and determine a preview speed within the speed bounds. Step 420 takes the outputs of the EE mode calculation and the adaptive cruise control calculation and utilizes an algorithm to determine whether the energy efficiency gained in the EE mode justifies setting the potential control speed over the preview speed. Steps 422 and 424 set the control speed to either the preview speed or the potential control speed, respectively, and reiterate process 400 to adjust to changing conditions. In this way, process 400 selects between settings determined by the EE mode and the adaptive cruise control by balancing the goals of energy efficiency and automatic speed control.

Figure 9:
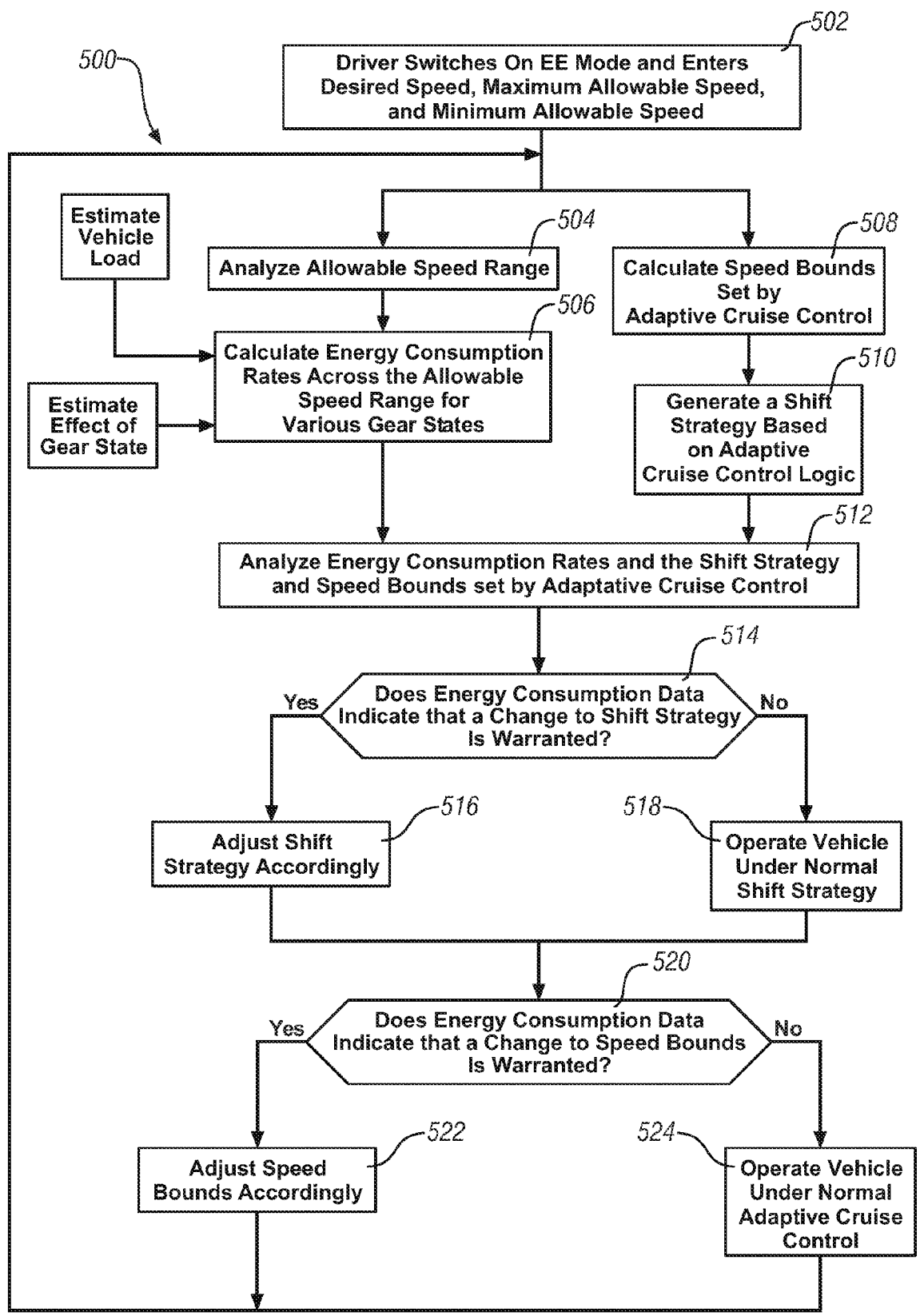
FIG. 9 is a flowchart depicting an alternative exemplary process in combination with adaptive cruise control in accordance with the present disclosure.

EE mode and adaptive cruise control may in some embodiments cooperate in an alternative fashion, wherein inputs from the EE mode may operate to change the speed bounds and transmission strategy set by the adaptive cruise control. FIG. 9 illustrates an exemplary process 500 wherein calculations made within the EE module 30 are used to adjust settings determined by adaptive cruise control module 50 in accordance with the disclosure. In step 502, the driver switches on the EE mode and inputs the relevant EE mode parameters. Steps 504 and 506 generate energy consumption rates across various gear states for the allowable speed range, and steps 508 and 510 generate speed bounds and shift strategy through the adaptive cruise control logic. Steps 512 through 524 accept the outputs of the EE mode calculations and the adaptive cruise control calculations, and these steps determine whether energy efficiency goals justify modifying either the speed bounds or the shift strategy from the values set by the adaptive cruise control logic. By adjusting the speed bounds in process 500 instead of replacing the preview speed as in process 400, the EE mode embodied in process 500 allows the automatic speed control set in the preview speed to maintain speeds set by drivability concerns while allowing more energy efficient speed control when the preview speed would operate in the energy efficient zone but for the normally determined speed bounds. Likewise, the changes to shifting strategy enabled in process 500 allow for the preview speed to continue setting the vehicle speed, while opportunities for energy efficient operation may still be utilized by moving shift points in coordination with energy consumption rate data. In this way, process 500 integrates EE mode capabilities with adaptive cruise control operation without adjusting the preview speed set by the adaptive cruise control logic.

The methods described above have focused on current or proximately sensed road conditions, such as vehicle location designated by GPS device 60 or traffic conditions determined by an on-board sensor 70 in the form of a radar device. However, modern GPS systems including route planning functions have enabled the analysis of planned travel routes. Known systems describe, for instance, an estimated distance to the planned destination. With the entry of a planned travel route in GPS device 60 and in coordination with remote processing unit 80, EE module 30 may calculate energy consumption rates throughout a planned trip, taking into account speed limits, road slope, vehicle load, known traffic and construction issues, driver operating patterns, and other variables that affect energy efficiency. Based upon these calculated energy consumption rates, EE module 30 may generate a powertrain management schedule, estimating potential control speeds and optimally efficient energy strategies throughout the planned trip. Additionally, EE module 30 may cooperate with GPS device 60 to suggest more energy efficient routes to reach the desired destination. In one embodiment, the EE module 30 equipped with planned travel route calculations can operated in conjunction with an adaptive cruise control unit to generate a powertrain management schedule, taking into account both energy efficiency goals and drivability concerns associated with automatic speed control. In another embodiment, an EE module 30 equipped with planned travel route calculations can be operated with a hybrid electric vehicle. Such an embodiment can generate a power utilization schedule, in which battery charging and discharging cycles are coordinated with the planned route to make battery cycles as efficient as possible. For instance, in a planned route, a power utilization schedule may determine to utilize a battery fully in the first portion of a trip at low speeds in anticipation of a later portion of the trip planned at highway speeds, where it is known that travel under engine power is more desirable. Alternatively, preferences may be set in the driver interface device 40 such that vehicle batteries will be fully utilized at the end of the trip in anticipation of a plug-in recharging station.

Figure 10:
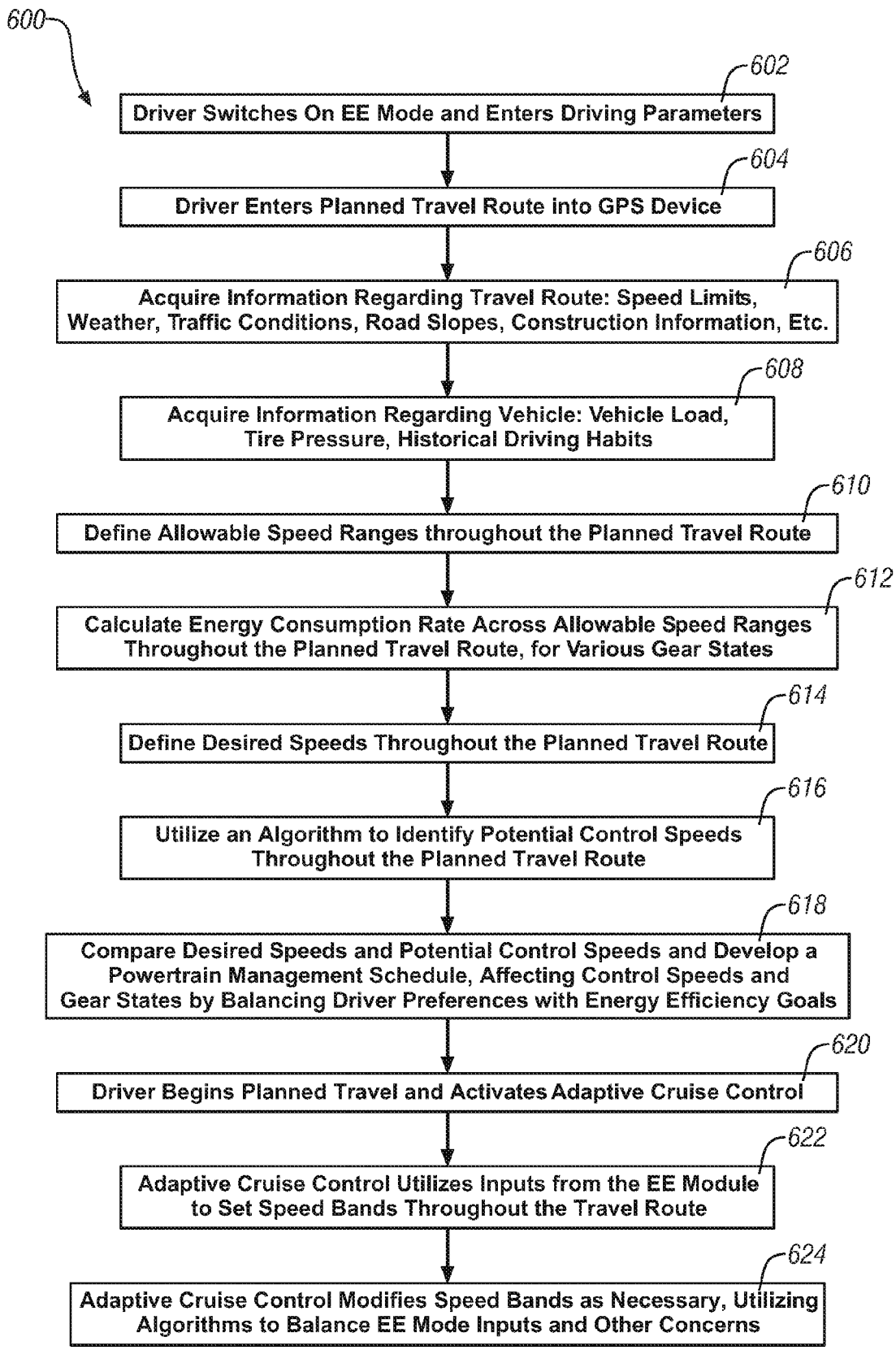
FIG. 10 is a flowchart depicting operation of an alternative exemplary process throughout a planned travel route in accordance with the present disclosure.

FIG. 10 illustrates an exemplary process 600 wherein an EE mode performs calculations in support of energy efficient operation throughout a planned travel route. The driver in step 602 switches on the EE mode and enters driving parameters related to the EE mode. Next, the driver in step 604 enters the planned travel route into GPS device 60. EE module 30 in step 606 acquires information regarding the planned travel route including speed limits over various sections of road to be traveled, weather conditions, traffic conditions, road slopes, and construction information. Next, EE module in step 608 acquires information regarding the operation of vehicle 10, including vehicle load, tire pressures, and the historical driving habits of the operator. In steps 610 through 614, EE module 30 analyzes the roads throughout the planned travel route, generates allowable speed ranges for each section of road, calculates energy consumption rates across allowable speed ranges at various gear states throughout the planned travel route, and defines desired speeds throughout the panned travel route on the basis of driver inputs and complied information. In step 616, EE module 30 utilizes an algorithm to identify potential control speeds throughout the planned travel route. In step 618, EE module 30 compares desire speeds and potential control speeds throughout the travel route and generates a powertrain management schedule through a trip algorithm, affecting control speeds and gear states by balancing energy efficiency goals with driver preferences. The driver begins the planned travel in step 620 and activates adaptive cruise control. In steps 622 and 624, the adaptive cruise control, maintaining automatic speed control in conjunction with a number of inputs, cooperates with the powertrain management schedule generated in previous steps. It should be noted that process 600 is described with adaptive cruise control engaged fully throughout the trip. It is contemplated that process 600 can be operated with a decision block such as is illustrated in 210 of FIG. 6, allowing trip algorithms and control features to be used with changing cruise or normal operation settings. Also, as described above, process 600 can be operated in a hybrid vehicle, the trip algorithm including battery charge and discharge strategy depending on travel information. In this way, process 600 through analysis of vehicle and travel route information allows the energy efficiency of the vehicle to improve from a broader view over an entire planned trip.

Processes 100 through 600 describe numerous features and embodiments which the disclosed methods may include. However, it should be appreciated that the specific features of the individual embodiments illustrated are not meant to be exclusive, and elements from one process could be combined with or augment the elements of another process and still be in accordance with the present disclosure.

Selection of EE mode may be performed by a dedicated switch or selected option. In the alternative, selection of EE mode may be part of a larger vehicle scheme, for example, an economy switch could be utilized to activate EE mode and other fuel saving measures not described herein at the same time. In commercial vehicles, operation of EE mode and adjustment of the parameters thereof could be performed and maintained remotely.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for improving energy efficient operation of a vehicle, wherein a microprocessor performs the following steps:
    monitoring vehicle operating characteristics comprising analyzing vehicle load and road topology and analyzing at least one of weather conditions, traffic conditions, road conditions, tire pressure, vehicle maintenance history, and driver operating patterns;
    modeling operation of said vehicle, said modeling utilizing said vehicle operating characteristics to estimate energy consumption rates of said vehicle across an allowable speed range, wherein said allowable speed range comprises a maximum allowable speed corresponding to a maximum legal speed and a minimum allowable speed some speed interval less than said maximum legal speed;
    determining a potential control speed within the allowable speed range on the basis of said energy consumption rates; and
    generating a control output to said vehicle comprising setting a control speed based upon the potential control speed.

2. The method of claim 1, further comprising defining said allowable speed range with at least one of a minimum allowable speed and a maximum allowable speed.

3. The method of claim 1, further comprising defining a desired speed within said allowable speed range; and
    wherein setting said control speed based upon said potential control speed comprises:
        selecting between said desired speed and said potential control speed by balancing an energy consumption differential between an energy consumption rate at said desired speed and an energy consumption rate at said potential control speed against a speed differential between said desired speed and said potential control speed.

4. The method of claim 1, further comprising selecting a hybrid operating state defining selection of fuel power and battery power for said vehicle.

5. The method of claim 1, further comprising selecting a transmission gear state for said vehicle.

6. The method of claim 1, further comprising selecting a hybrid operating state defining selection of fuel power and battery power for said vehicle and a transmission gear state for said vehicle.

7. The method of claim 1, further comprising projecting said energy consumption rates across said allowable speed range over a planned travel route.

8. The method of claim 7, further comprising generating a speed change schedule on the basis of said projected energy consumption rates.

9. The method of claim 8, said method further comprising updating said speed change schedule in coordination with an adaptive cruise control module.

10. The method of claim 7, further comprising generating a transmission shift strategy on the basis of said projected energy consumption rates.

11. The method of claim 7, further comprising generating a hybrid powertrain energy consumption schedule on the basis of said projected energy consumption rates.

12. The method of claim 11, further comprising generating a hybrid powertrain battery charging schedule on the basis of said projected energy consumption rates.

13. The method of claim 7, further comprising generating travel route recommendations on the basis of said projected energy consumption rates.

14. The method of claim 1, further comprising:
operating said vehicle under cruise control;
determining the potential control speed within said allowable speed range and a corresponding transmission gear state on the basis of said energy consumption rates;
selecting a cruise speed and a transmission gear state command based upon the potential control speed and the corresponding transmission gear state; and
controlling the vehicle based upon the cruise speed and the transmission gear state command.

15. The method of claim 14, further comprising previewing potential future vehicle operating characteristics based on a planned travel route, wherein said selecting a cruise speed includes forming a speed control strategy and a transmission gear state strategy over said planned travel route.

* * * * *